US012712486B2

(12) United States Patent
Dunham et al.

(10) Patent No.: US 12,712,486 B2
(45) Date of Patent: Aug. 18, 2026

(54) EXPANDABLE SOLAR ARRAY

(71) Applicant: RV Mobile Power, LLC, Columbus, OH (US)

(72) Inventors: Tyler Dunham, Dublin, OH (US); James Conroy, II, Columbus, OH (US)

(73) Assignee: RV MOBILE POWER, LLC, Columbus, OH (US)

( * ) Notice: Subject to any disclaimer, the term of this patent is extended or adjusted under 35 U.S.C. 154(b) by 0 days.

(21) Appl. No.: 18/467,766

(22) Filed: Sep. 15, 2023

(65) Prior Publication Data

US 2024/0097611 A1 Mar. 21, 2024

Related U.S. Application Data

(60) Provisional application No. 63/407,395, filed on Sep. 16, 2022.

(51) Int. Cl.
*H02S 30/20* (2014.01)
*B60P 3/36* (2006.01)

(52) U.S. Cl.
CPC ................ *H02S 30/20* (2014.12); *B60P 3/36* (2013.01)

(58) Field of Classification Search
CPC ..................... H02S 20/00–32; H02S 30/00–20
USPC .................................................. 136/243–265
See application file for complete search history.

(56) References Cited

U.S. PATENT DOCUMENTS 6,269,824 B1 * 8/2001 Brutsaert ................ B60P 3/341 160/67
2023/0299713 A1 * 9/2023 Wang ...................... H02S 40/30 136/245

FOREIGN PATENT DOCUMENTS

CN 109318787 A * 2/2019 ................ B60P 3/34
CN 209126670 U * 7/2019
CN 215398394 U * 1/2022
KR 101947401 B1 * 2/2019

OTHER PUBLICATIONS

KR-101947401-B1 English (Year: 2019).*
CN-109318787-A English (Year: 2019).*
CN-215398394-U English (Year: 2022).*
CN-209126670-U English (Year: 2019).*

* cited by examiner

*Primary Examiner* — Bach T Dinh
(74) *Attorney, Agent, or Firm* — Suiter Swantz IP

(57) ABSTRACT

The embodiments herein provide a slide out solar array having a frame adapted to be fastened to the roof of a vehicle, a first solar panel attached to the frame, a linear rolling support attached to the frame, a second solar panel attached to the linear rolling support, and a vertical drive arm connected to the second solar panel. Embodiments include a wire routing compartment positioned between the frame and the first solar panel as well as raceways and rolling supports positioned within the linear rolling support. The vertical drive arm can be actuated manually by a user or can be actuated when a slide out for a recreational vehicle is extended/retracted.

17 Claims, 11 Drawing Sheets

EXPANDABLE SOLAR ARRAY

CROSS-REFERENCE TO RELATED APPLICATIONS

This application claims priority to U.S. Provisional Application No. 63/407,395 filed on Sep. 16, 2022, which is herein incorporated by reference in its entirety.

TECHNICAL FIELD

Embodiments generally relate to expandable solar panel arrays that can be optionally collapsed and expanded by RV slide outs or manually by a user.

BACKGROUND OF THE ART

Recreational Vehicles such as campers, trailers, motor coaches, buses, and camper vans (herein 'RVs') have traditionally been powered with gas-powered generators and a separate 12V battery. It is now desirable to incorporate solar power as the primary inputs for an RV power system, but the primary limitation is space for solar on the roof of an RV. Every RV roof system will have a limited amount of total footprint available, with a number of components that already take up substantially portions of this footprint.

It is therefore desirable to design an RV solar system that can automatically collapse and expand using existing equipment already on the RV.

SUMMARY OF THE EXEMPLARY EMBODIMENTS

Exemplary embodiments provide an expandable solar panel array that is driven from the slide out in a RV. Several panels can be stacked atop each other with lower panels sliding out from beneath upper panels. A vertical drive arm can be used to connect the outer solar panels with the slide out so that as the slide out expands/contracts the solar array will expand/contract similarly.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

Figure 1A:
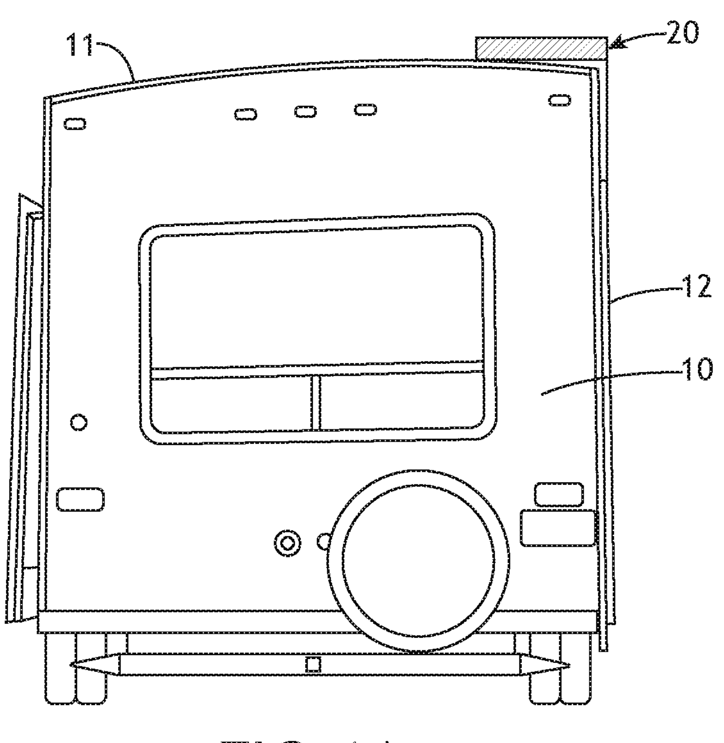
FIG. 1A is a rear projection view of an RV showing an embodiment of the expandable solar array when in the collapsed position and indicating the location of Detail A.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

INDEX OF NUMERAL CALLOUTS

10 Recreational Vehicle (RV)
11 RV Roof
12 RV slide out
20 expandable solar array assembly
50 solar panel
80 vertical drive arm
85 frame
90 wire routing compartment
100 linear rolling support guide assembly
110 upper outer rolling support
111 lower outer rolling support
112 upper inner rolling support
113 lower inner rolling support
125 inner linear guide
126 bottom raceway
127 top raceway
150 central linear guide
151 bottom raceway
152 top raceway
153 bottom raceway
154 top raceway
175 outer linear guide
176 top raceway
177 bottom raceway FIG. 1A is a rear projection view of an RV 10 with a roof 11 and showing an embodiment of the expandable solar array 20 when in the collapsed position and indicating the location of Detail A.

Figure 1B:
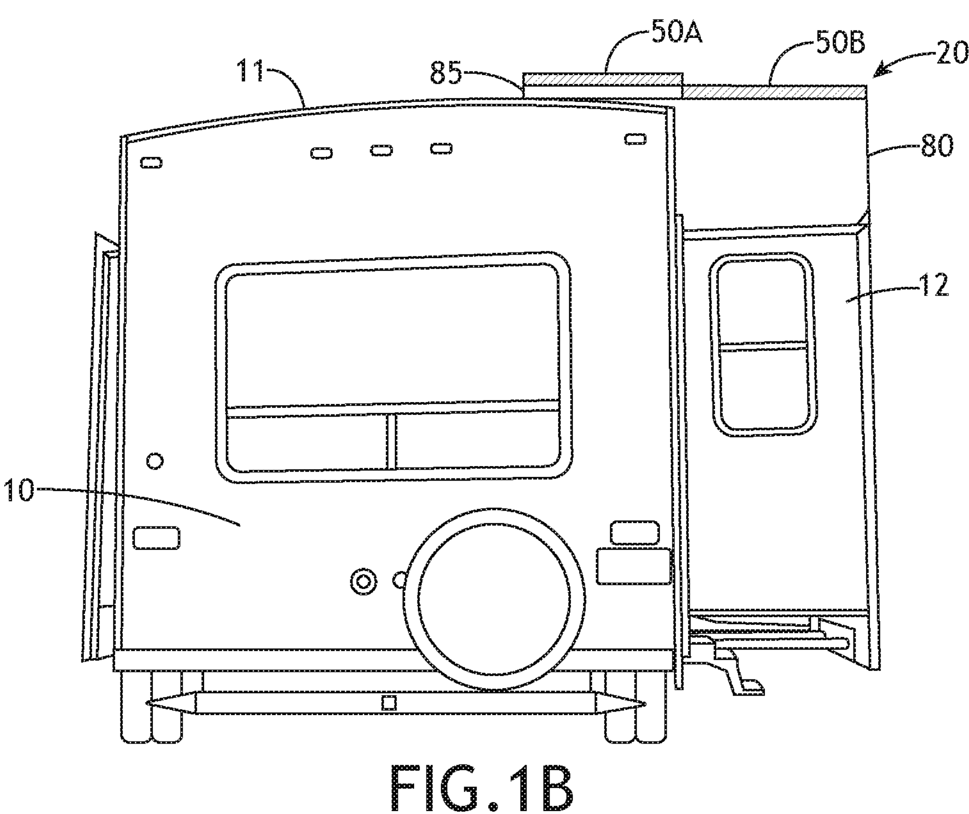
FIG. 1B is a rear projection view of an RV showing an embodiment of the expandable solar array when in the fully extended position.

FIG. 1B is a rear projection view of an RV 10 showing an embodiment of the expandable solar array 20 when in the fully extended position. This particular embodiment uses two solar panels 50A and 50B which when extended, both preferably receive full view of the sky. Solar panel 50B slides beneath solar panel 50A using linear guides and a vertical drive arm 80 that is connected to the slide out 12. In this manner, the extension of the RV slide out 12 causes solar panel 50B to extend outwardly and away from solar panel 50A which is generally held in fixed position while the other panel(s) slide below. In reverse, when the RV slide out 12 is collapsed back into the RV, solar panel 50B is driven inwardly towards the RV and below panel 50A through the connection with the vertical drive arm 80.

Figure 2A:
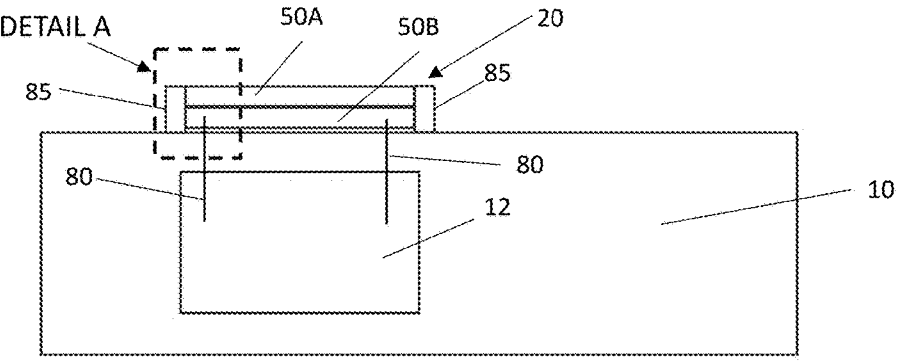
FIG. 2A is a side projection view of an RV showing the embodiment of the expandable solar array of FIGS. 1A-1B when in the collapsed position and indicating the location of Detail A.

FIG. 2A is a side projection view of an RV showing the embodiment of the expandable solar array 20 of FIGS. 1A-1B when in the collapsed position and indicating the location of Detail A. In a preferred embodiment, the frame 85 would extend to both sides of the solar panels 50A/50B and this could be accomplished either as a single frame piece which extends to both sides of the solar panels 50A/50B or a pair of separate pieces (i.e. a first frame 85 on the left side of the solar panels and a second frame 85 positioned on the right side of the solar panels). In each embodiment, the frame 85 should support opposing edges of the solar panels 50A/50B.

Thus, embodiments could be described as having a single frame 85 which supports a first edge of solar panels 50A/50B as well as the opposing second edge of solar panels 50A/50B. Alternatively, embodiments could use a first frame 85 which supports a first edge of solar panels 50A/50B while a second frame 85 supports a second opposing edge of solar panels 50A/50B. As will be described further below, in preferred embodiments the frame 85 would directly support solar panel 50A while the frame 85 would support solar panel 50B through a mutual connection to the linear guide 100. However, this is not required as alternative embodiments could also have the frame 85 directly support solar panel 50B while the frame 85 would support solar panel 50A through a mutual connection to the linear guide 100. Either orientation would be included within the scope of this invention.

Figure 2B:
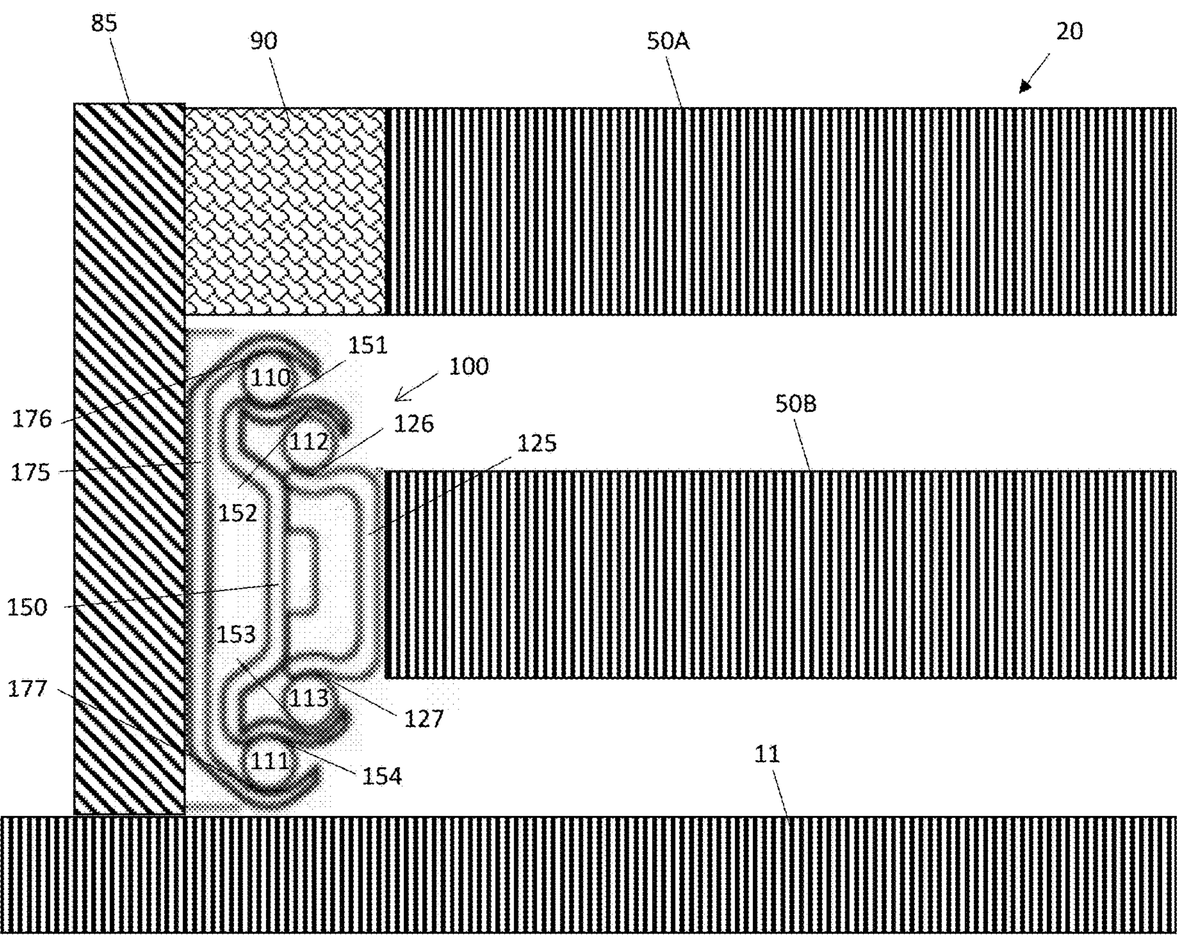
FIG. 2B is a detailed section view of Detail A shown in FIG. 2A, where the section has been taken vertically through the expandable solar array.

FIG. 2B is a detailed section view of Detail A shown in FIG. 2A, where the section has been taken vertically through the expandable solar array 20. In this embodiment, a frame 85 is bonded and/or fastened to the roof 11 of the RV and has an upper portion which connects to solar panel 50A and a bottom portion which connects to the linear guide 100. In some embodiments, a wire routing compartment 90 is positioned between the frame 85 and the solar panel 50A, but in other embodiments this could just be a bracket for attaching to the solar panel 50A. When used, the wire routing compartment 90 can contain the PV electric cables which connect to solar panel 50A, top provide a clean look to the installation and protect wires from snagging or coming loose. Also, the compartment 90 can contain the PV electric cables which connect to solar panel 50B and can provide an area for the cables to slide back and forth along with the solar panel 50B and prevent the cables from tangling or snagging within the linear rolling support guide assembly 100 or elsewhere.

The linear rolling support guide assembly 100 (linear guide) is positioned between the frame 85 and the solar panel 50B and preferably contains a plurality of elements that connect the two components while allowing the solar panel 50B to slide with very little friction. The linear guide 100 generally comprises an inner linear guide 125 which attaches to the solar panel 50B, a central linear guide 150 which slides between the inner and outer guides, and an outer linear guide 175 which attaches to the frame 85.

An upper outer rolling support 110 is contained within a raceway defined at the upper portion with top raceway 176 defined by the inner guide 175 and at the lower portion with bottom raceway 151 defined by the central guide 150. A lower outer rolling support 111 is contained within a raceway defined at the upper portion with top raceway 154 defined by the central guide 150 and at the lower portion with a bottom raceway 177 defined by the outer guide 175. An upper inner rolling support 112 is contained within a raceway defined at the upper portion by top raceway 152 defined by the central guide 150 and at the lower portion with a bottom raceway 126 defined by the inner guide 125. A lower inner rolling support 113 is contained within a raceway defined at the upper portion with a top raceway 127 defined by the inner guide 125 and at the lower portion with a bottom raceway 153 defined by the central guide 150.

Each of the rolling supports 110, 111, 112, and 113 shown herein could be a ball bearing/spherical, cylindrical, needle, or tapered support elements. Although shown generally herein with ball bearings, it should be specifically noted that any of these types of rolling supports could be used, depending on the amount of side loads that will be experienced by the solar array, as well as how many vertical drive arms 80 are used (less arms 80 will likely increase the side loads on the guides, while more would likely reduce the side loads). The supports 110-113 can be implanted in a bed of grease or oil and sealed to prevent intrusion of dust, dirt, and water. Alternatively, the supports may be comprised of a softer plastic such as nylon with natural lubricating properties, that roll within a metallic, plastic, or composite raceway. In other words, the inner guide 125, central guide 150, and outer guide 175 could be comprised of metal, plastic, or a composite material.

Figure 3A:
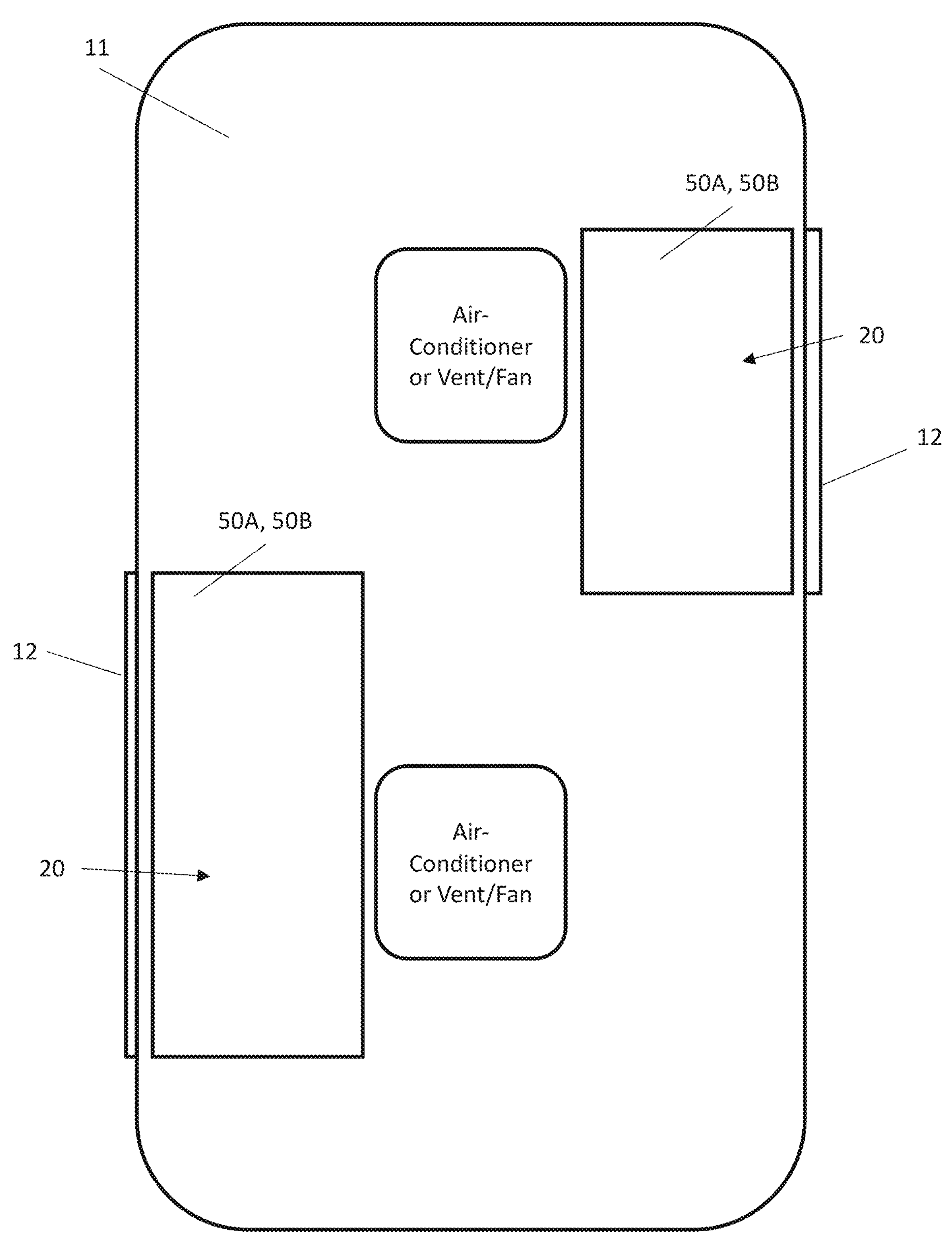
FIG. 3A is a top plan view of the embodiment shown in FIGS. 1-2 where the expandable solar array is shown in the collapsed position.

FIG. 3A is a top plan view of the embodiment shown in FIGS. 1-2 where the expandable solar array 20 is shown in the collapsed position on another RV roof 11 where a pair of air-conditioners or vent/fans are positioned near the centerline of the RV roof. This arrangement of large rectangular appliances near the centerline of the RV roof 11 is quite common, and causes issues with mounting traditional solar panels in any meaningful number or square footage. As shown herein, the expandable solar array 20 can fit between these rectangular appliances and the sidewall of the RV, so that when collapsed, the array 20 does not take up any more room than a single solar panel along the edge of the roof.

Figure 3B:
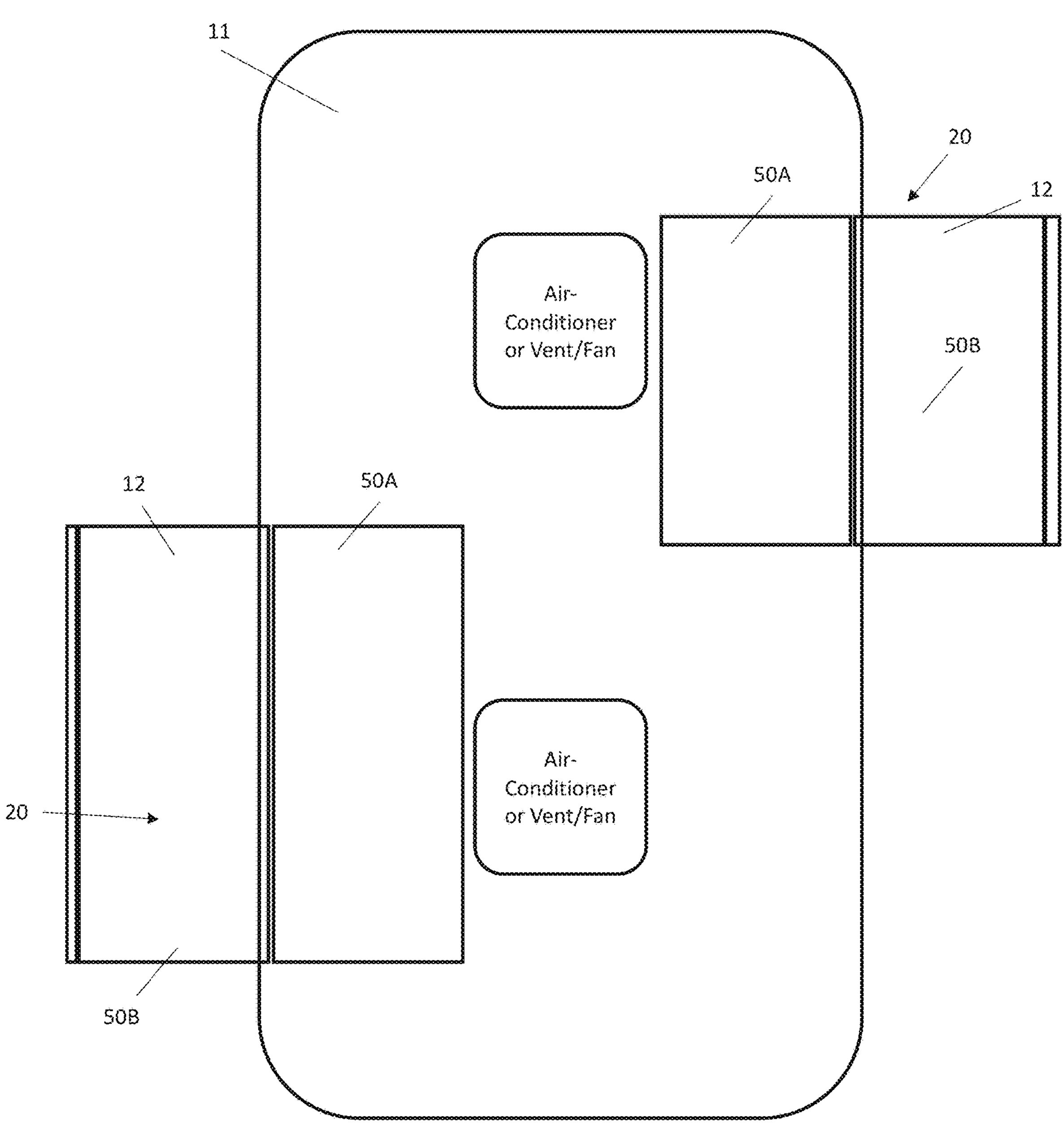
FIG. 3B is a top plan view of the embodiment shown in FIGS. 1-2 where the expandable solar array is shown in the fully extended position.

FIG. 3B is a top plan view of the embodiment shown in FIGS. 1-2 where the expandable solar array 20 is shown in the fully extended position. Here we see that solar panel 50A has mostly remained in its original position, while solar panel 50B has translated horizontally outwardly and away from the centerline of the RV along with the slide out 12. In this embodiment, the RV includes a pair of slide outs 12 with an expandable solar array 20 attached above each of the slide outs 12. Note that in this particular embodiment the solar array 20 is approximately the same length as the slide out 12. This is not required however, as will be shown further below in some additional preferred embodiments.

Figure 4A:
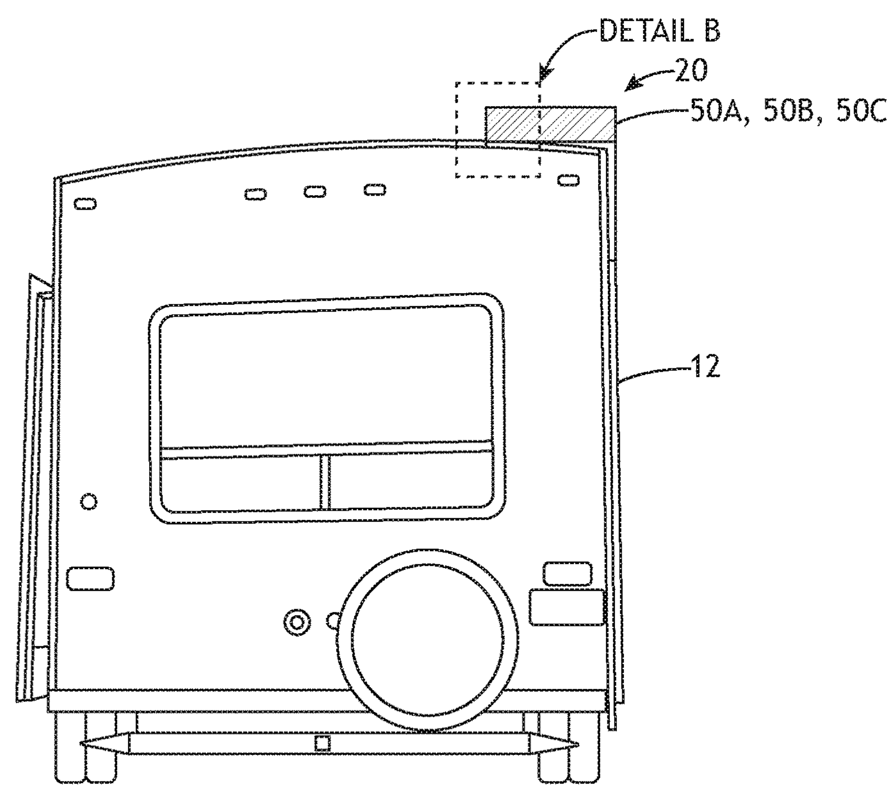
FIG. 4A is a rear projection view of an RV showing another embodiment of the expandable solar array when in the collapsed position and indicating the location of Detail B.
Figure 4B:
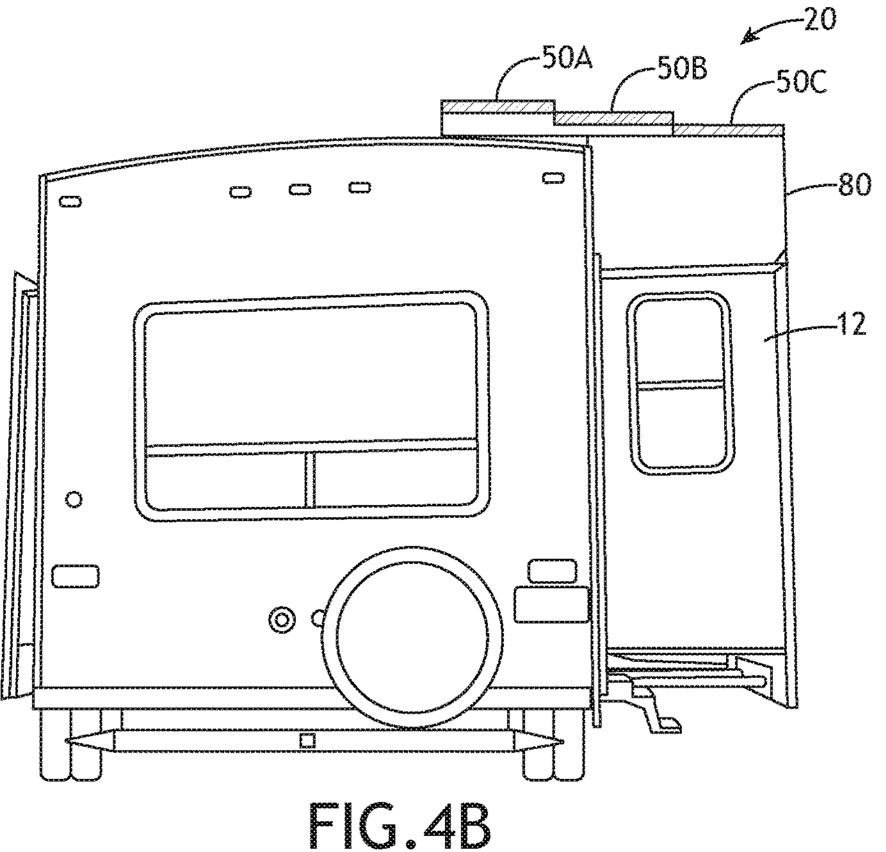
FIG. 4B is a rear projection view of an RV showing the embodiment of the expandable solar array from FIG. 4A when in the fully extended position.

FIG. 4A is a rear projection view of an RV showing another embodiment of the expandable solar array 20 when in the collapsed position and indicating the location of Detail B. FIG. 4B is a rear projection view of an RV showing the embodiment of the expandable solar array 20 from FIG. 4A when in the fully extended position. In this embodiment, a three-panel version of the expandable solar array 20 is used where a first solar panel 50A largely remains in place above a pair of panels 50B and 50C which slide out from beneath solar panel 50A as the slide out 12 is driven out by the slide out motors. The vertical drive arm 80 is preferably connected between the edge of solar panel 50C and the slide out 12.

Figure 5:
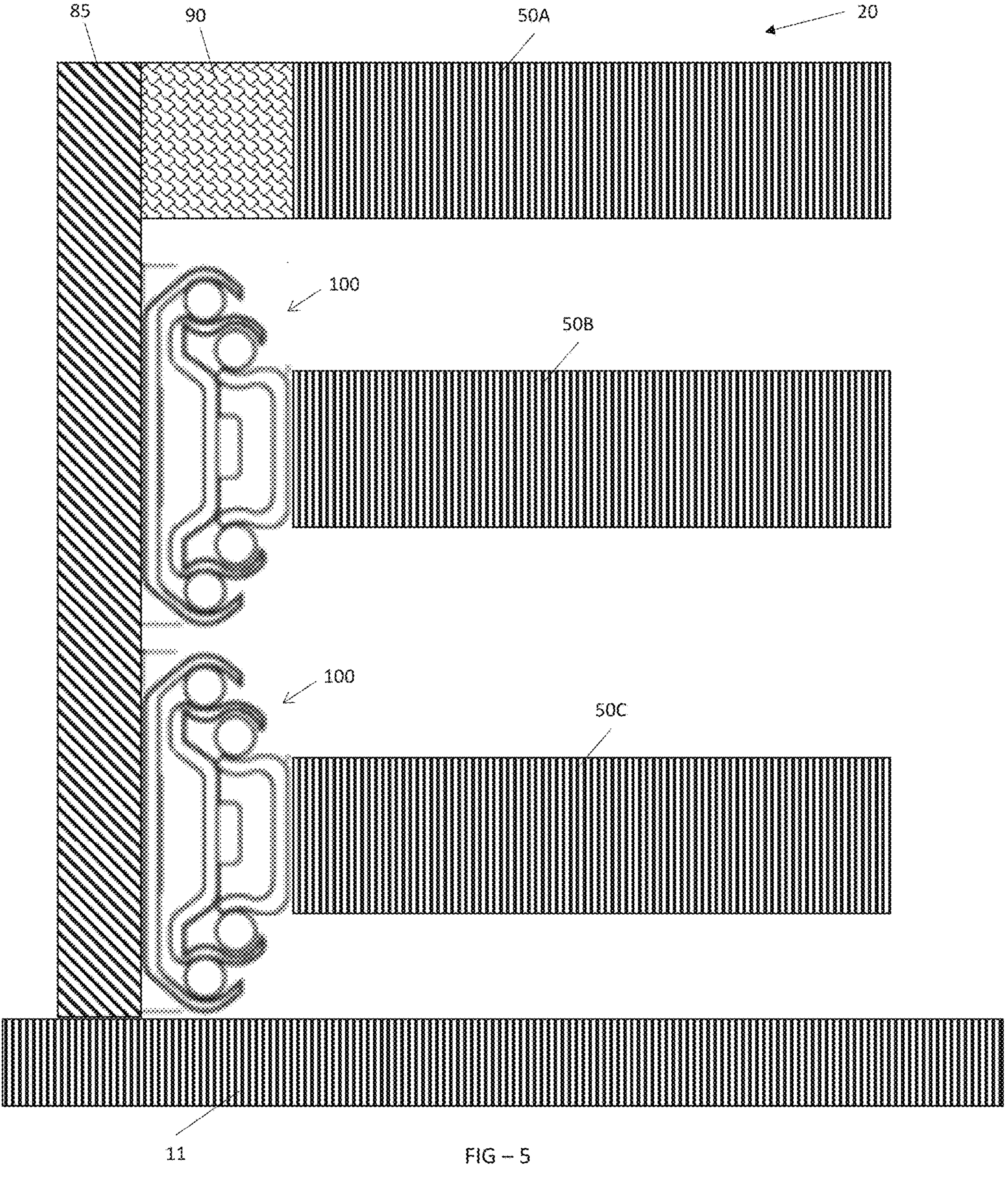
FIG. 5 is a detailed section view of Detail B shown in FIG. 4A, where the section has been taken vertically through the expandable solar array.

FIG. 5 is a detailed section view of Detail B shown in FIG. 4A, where the section has been taken vertically through the expandable solar array 20. Similar to the two-panel embodiment above in FIG. 2, a frame 85 is attached to the roof 11 and then attached to solar panel 50A which largely remains fixed in place. A wire routing compartment 90 can be located between panel 50A and the frame 85. Solar panel 50A is then attached to linear guide 100 which is attached to the frame 85. Similarly, solar panel 50B is attached to linear guide 100 which is attached to the frame 85. The details of the linear guides 100 and their components are the same as described above.

Figure 6A:
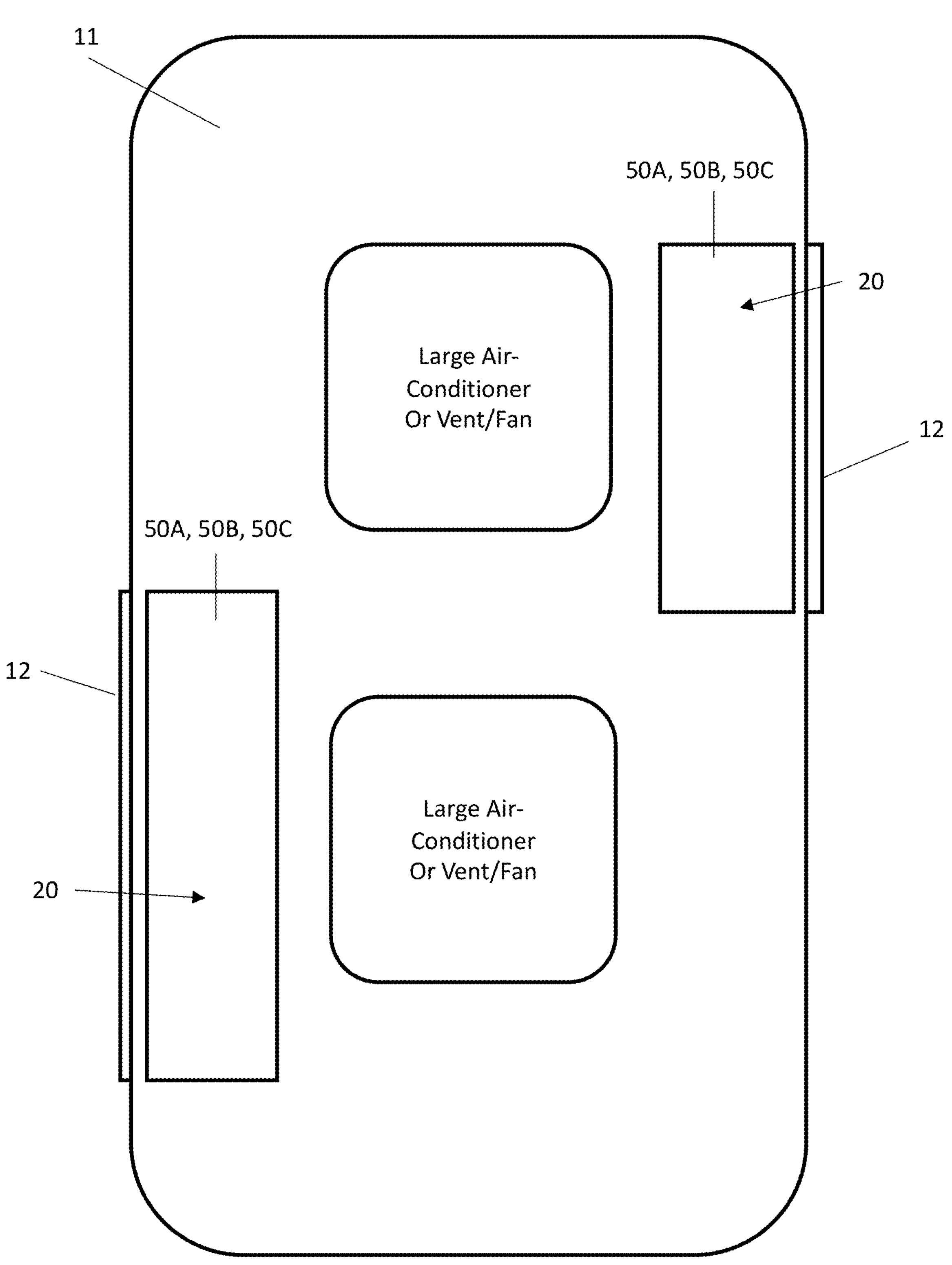
FIG. 6A is a top plan view of the embodiment shown in FIGS. 4-5 where the expandable solar array is shown in the collapsed position.
Figure 6B:
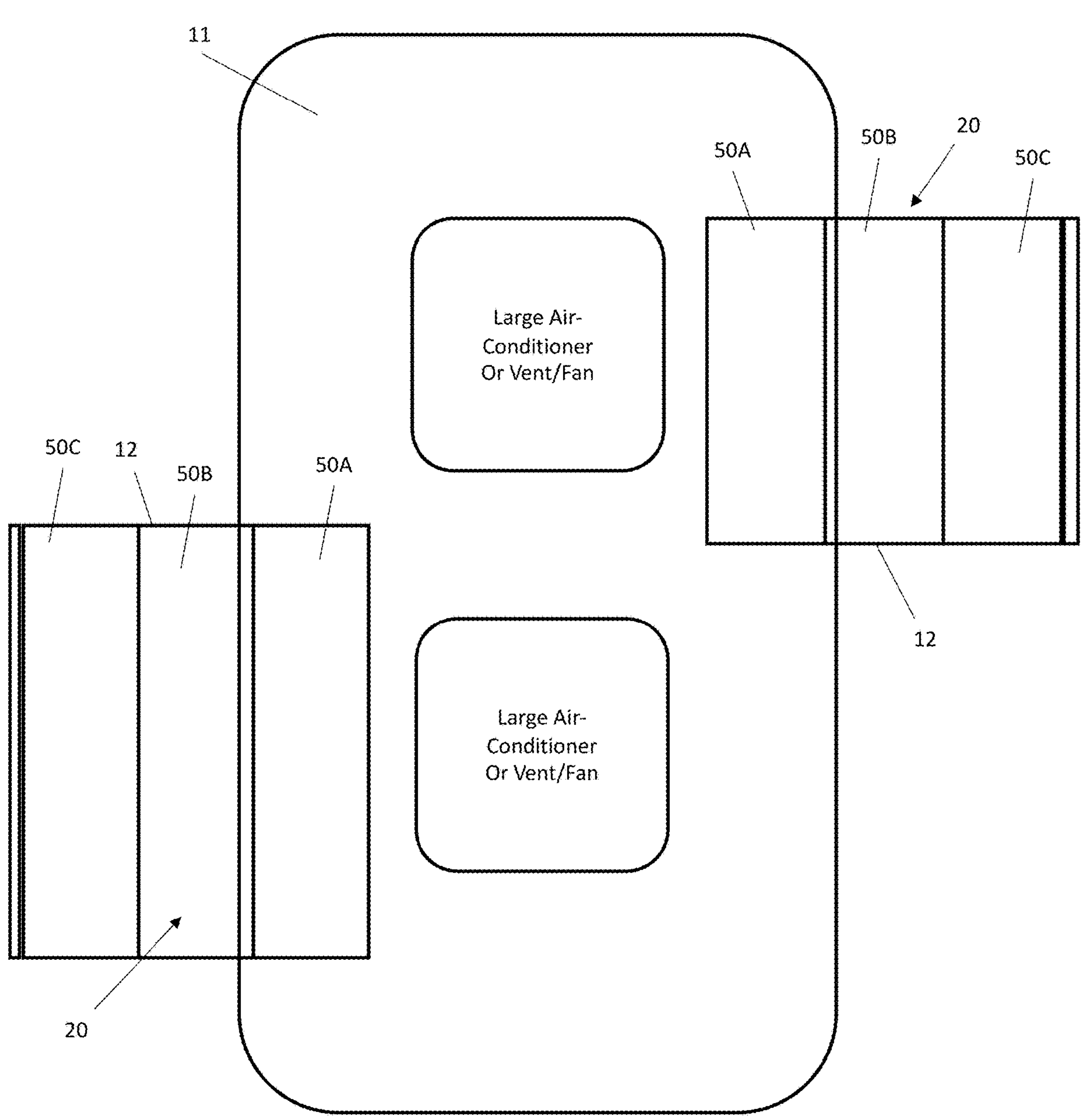
FIG. 6B is a top plan view of the embodiment shown in FIGS. 4-5 where the expandable solar array is shown in the fully extended position.

FIG. 6A is a top plan view of the embodiment shown in FIGS. 4-5 where the expandable solar array 20 is shown in the collapsed position. FIG. 6B is a top plan view of the embodiment shown in FIGS. 4-5 where the expandable solar array 20 is shown in the fully extended position. In this embodiment, the width of solar panels 50B and 50C combined together is approximately the same width of the slide out 12, and each panel 50A and 50B is preferably the same length as the slide out 12. The width of solar panel 50A is approximately the distance between the edge of the air-conditioner/vent/fan and the sidewall of the RV. It is generally believed that when working around larger rectangular appliances, the three-panel version may be more appropriate.

Figure 7A:
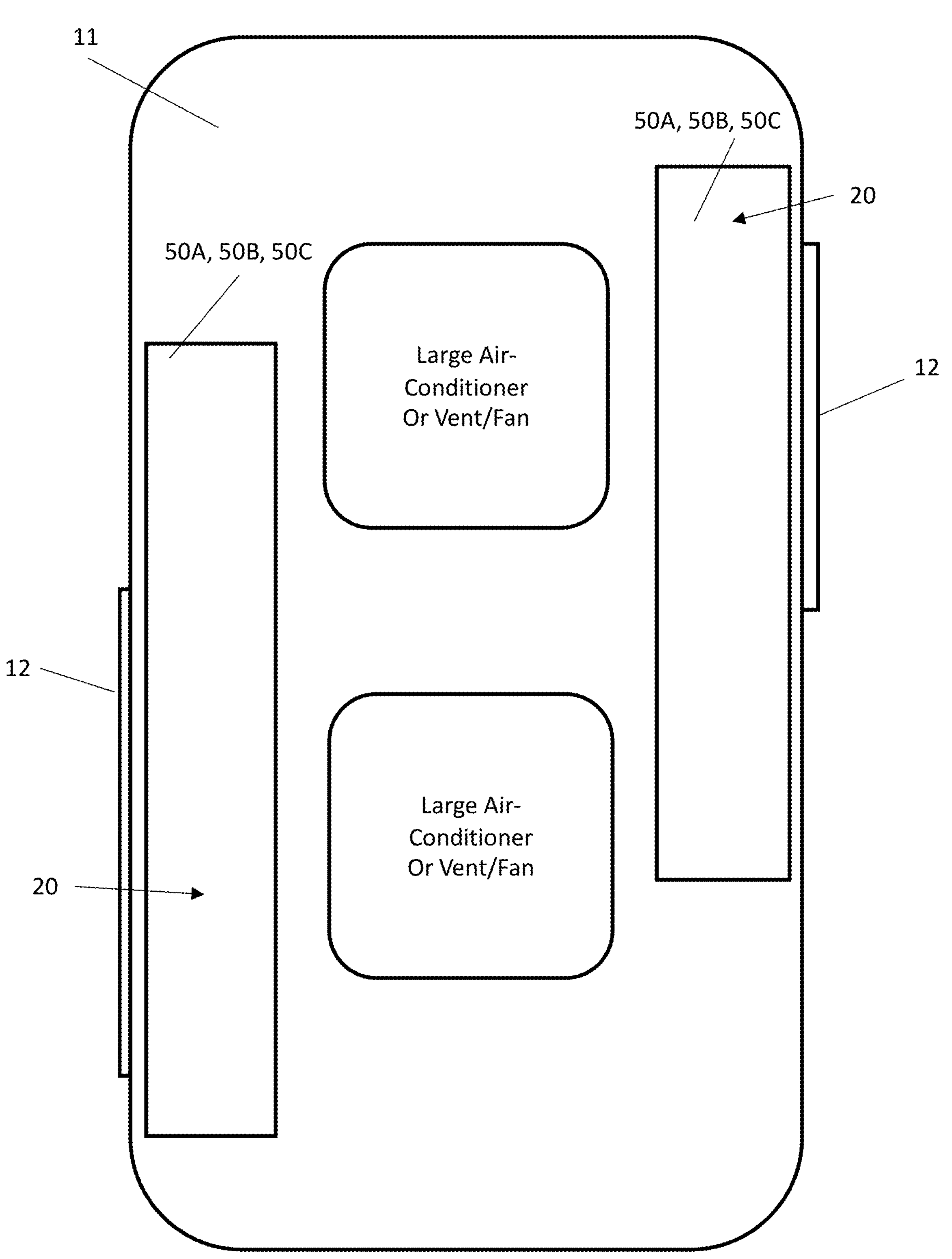
FIG. 7A is a top plan view of another embodiment of the expandable solar array where the expandable solar array is shown in the collapsed position.

FIG. 7A is a top plan view of another embodiment of the expandable solar array 20 where the expandable solar array is shown in the collapsed position. In this embodiment, the solar panels 50A, 50B, and 50C are each longer than the slide out 12. As shown, each of the expandable solar arrays 20 extend well beyond the slide out 12 in both dimensions (above and below). Thus for this application, the same expandable solar array 20 could be used with any number of different sized slide outs 12. Additionally, the total solar capacity can be further expanded even when the RV has a relatively small slide out 12.

Figure 7B:
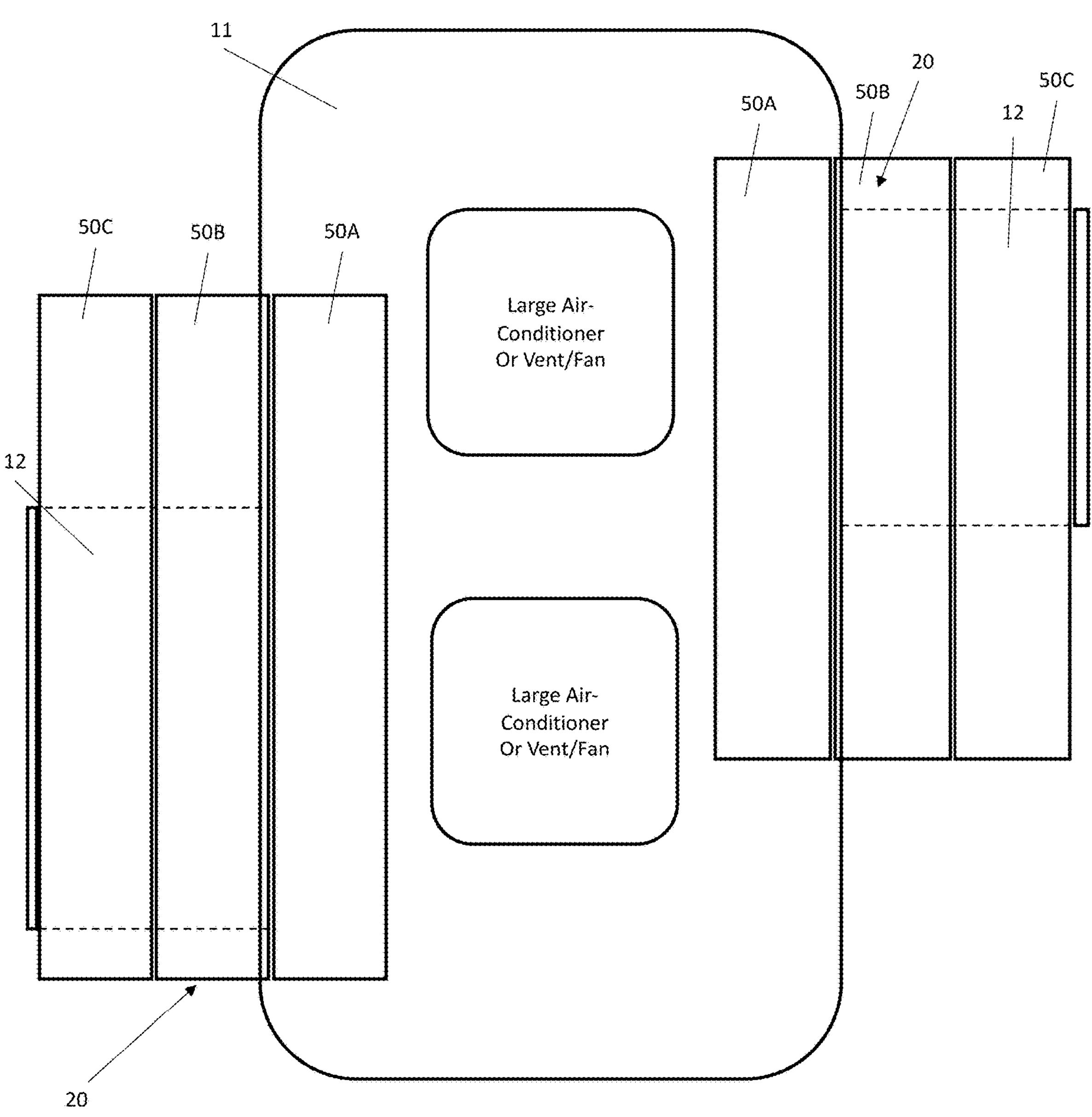
FIG. 7B is a top plan view of another embodiment of the expandable solar array where the expandable solar array is shown in the fully extended position.

FIG. 7B is a top plan view of the embodiment of the expandable solar array from FIG. 7A where the expandable solar array is shown in the fully extended position. Here the outline of the slide out 12 can be seen in dashed lines below the solar panels 50B and 50C. Thus the surface area of solar panels 50B and 50C above the slide out is substantially more than the surface area of the slide out itself. Said another way, the solar panels 50B and 50C extend well beyond the slide out 12, providing even more solar capacity.

It should be noted that while two-panel (50A-50B) and three-panel (50A-50C) embodiments have been shown herein, the same techniques can be applied to make any number of panels for any embodiment. Therefore, a four-panel, five-panel, etc. can easily be constructed and would be included within the base teachings herein.

Figure 8:
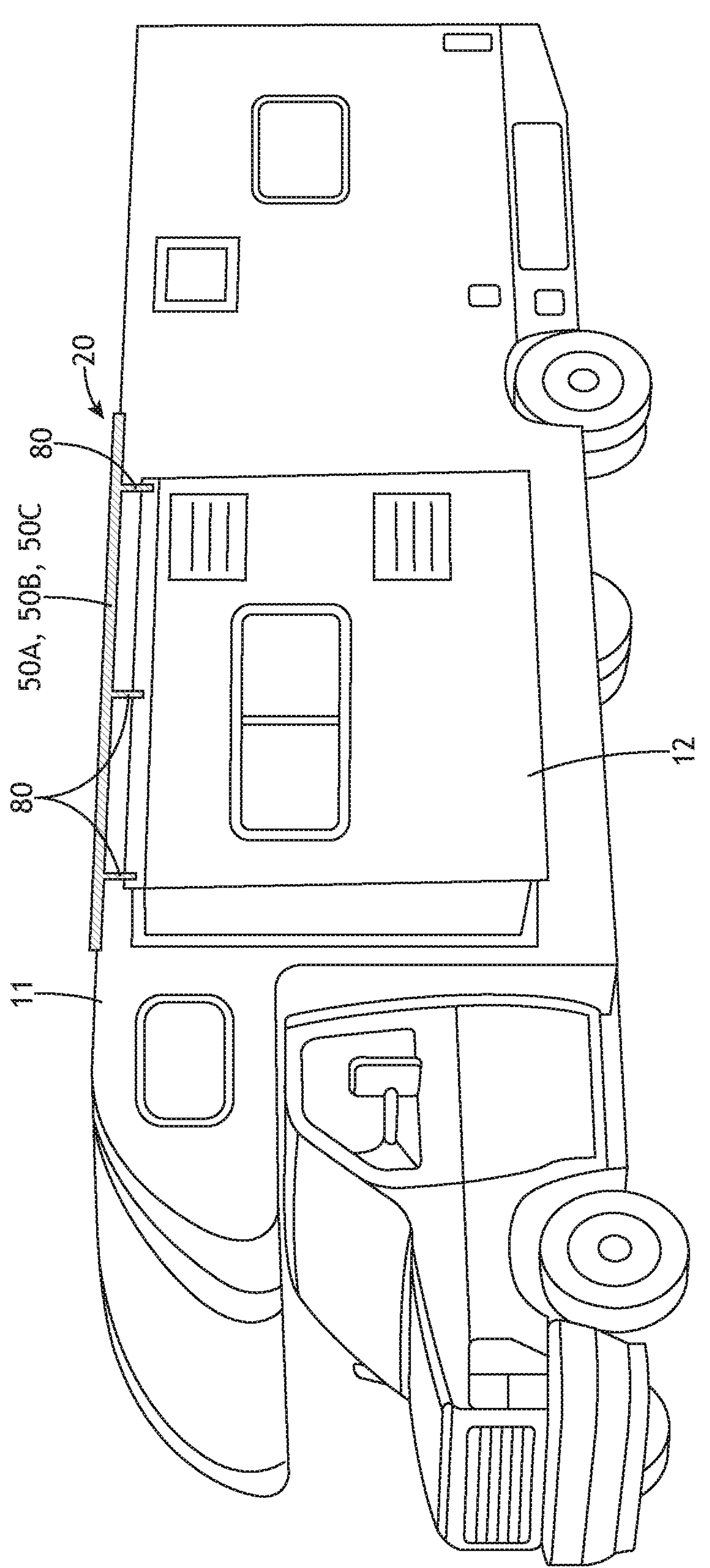
FIG. 8 is a side prospective view of an RV having an exemplary embodiment of the expandable solar array and showing the vertical drive arms.

FIG. 8 is a side prospective view of an RV having an exemplary embodiment of the expandable solar array 20 and showing the vertical drive arms 80. In this embodiment, three vertical drive arms 80 are used with a first placed near the front corner of the slide out 12, a second placed near the mid-point of the slide out 12, and a third placed near the rear corner of the slide out 12. Some embodiments may only require a single vertical drive arm 80, likely placed near the mid-point of the slide out 12. However, other embodiments may require even more vertical drive arms 80 than three, and they would be positioned across the slide out 12 preferably equidistant from each other.

While the embodiments herein have shown the vertical drive arm to be connected to a slide out in order to facilitate the horizontal movement of second and/or third solar panels, it is also possible to use the vertical drive arm manually (i.e. where a user grasps one end of the vertical drive arm to slide the solar panel(s) out horizontally to have a full view of the sky. The vertical drive arm could also be removable and stored within the RV until parked and then a user can use the vertical drive arm to temporarily connect to the solar panel(s) and slide them out horizontally, and this would be within the scope of the present invention.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

What is claimed is:

1. A slide out solar array comprising:

a frame adapted to be fastened to the roof of a recreational vehicle;

a first solar panel attached to the frame such that it remains fixed in place relative to the frame;

a pair of linear guides attached to the frame;

a second solar panel attached to the pair of linear guides so that the second solar panel can slide horizontally underneath the first solar panel; and a vertical drive arm having two ends where a first end is connected to the second solar panel and the second end is adapted to connect to a slide out that extends from the recreational vehicle, wherein the first solar panel and the second solar panel are longer than the slide out.

2. The slide out solar array of claim 1 wherein:

the frame is further adapted to be placed above a slide out that extends from the recreational vehicle.

3. The slide out solar array of claim 1 wherein:

the first solar panel and the second solar panel extend beyond the slide out.

4. The slide out solar array of claim 1 further comprising:

a wire routing compartment between the frame and the first solar panel adapted to receive solar panel wires.

5. The slide out solar array of claim 1 wherein:

each linear guide includes:

an outer linear guide attached to the frame;

an inner linear guide attached to the second solar panel;

a central linear guide positioned between the outer linear guide and inner linear guide and sliding in between the outer linear guide and inner linear guide.

6. The slide out solar array of claim 1 further comprising:

a second linear guide attached to the frame; and a third solar panel attached to the second linear guide via a rolling support.

7. The slide out solar array of claim 1 wherein:

the first solar panel remains stationary while the second solar panel is permitted to slide horizontally.

8. The slide out solar array of claim 1 wherein:

horizontal movement of the slide out causes the vertical drive arm to move the second solar panel horizontally while the first solar panel remains fixed.

9. The slide out solar array of claim 1 wherein:

movement of the slide out causes the second solar panel to slide horizontally.

10. The slide out solar array of claim 6 wherein:

the first solar panel, second solar panel, and third solar panel are all parallel.

11. The slide out solar array of claim 5 further comprising:

rolling supports positioned only within the linear guides.

12. The slide out solar array of claim 5 further comprising:

rolling supports positioned only between the second solar panel and the frame.

13. The slide out solar array of claim 1 wherein:

the vertical drive arm extends upwardly to keep the second solar panel in a horizontal position as it slides.

14. The slide out solar array of claim 1 wherein:

a surface area of the first solar panel and second solar panel is larger than a surface area of the slide out.

15. A slide out solar array comprising:

a frame adapted to be fastened to the roof of a recreational vehicle;

a first solar panel attached to the frame such that it remains fixed in place relative to the frame;

a pair of linear guides attached to the frame;

a second solar panel attached to the pair of linear guides so that the second solar panel can slide horizontally underneath the first solar panel and immediately adjacent to the roof of the recreational vehicle; and a vertical drive arm extending above the roof of the recreational vehicle and having two ends where a first end is connected to the second solar panel and the second end is adapted to connect to a slide out that extends from the recreational vehicle;

wherein the first solar panel and the second solar panel each extend beyond the slide out.

16. The slide out solar array of claim 1 wherein:

the vertical drive arm has a removable connection with the second solar panel such that the vertical drive arm is configured to be removed and stored in the recreational vehicle.

17. The slide out solar array of claim 1 wherein:

the vertical drive arm is configured so that a user can slide the second solar panel manually.

* * * * *